(12) United States Patent
Jayakumar et al.

(10) Patent No.: US 11,809,878 B2
(45) Date of Patent: Nov. 7, 2023

(54) DEPLOYMENT OF BIOS TO OPERATING SYSTEM DATA EXCHANGE

(71) Applicant: Intel Corporation, Santa Clara, CA (US)

(72) Inventors: Sarathy Jayakumar, Portland, OR (US); Mohan Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 16/790,203

(22) Filed: Feb. 13, 2020

(65) Prior Publication Data

US 2020/0257541 A1    Aug. 13, 2020

(51) Int. Cl.
*G06F 9/445* (2018.01)
*G06F 13/16* (2006.01)
*G06F 16/22* (2019.01)
*G06F 9/4401* (2018.01)
*G06F 8/65* (2018.01)

(52) U.S. Cl.
CPC ............ *G06F 9/44505* (2013.01); *G06F 8/65* (2013.01); *G06F 9/4401* (2013.01); *G06F 9/4411* (2013.01); *G06F 13/1668* (2013.01); *G06F 16/2228* (2019.01)

(58) Field of Classification Search
CPC ............ G06F 9/44505; G06F 13/1668; G06F 16/2228; G06F 8/65; G06F 9/4411; G06F 9/4401
See application file for complete search history.

(56) References Cited

U.S. PATENT DOCUMENTS

| 2006/0282651 | A1  | 12/2006 | Hobson |
| 2007/0006227 | A1* | 1/2007  | Kinney ............... G06F 9/45558 718/1 |
| 2014/0181811 | A1  | 6/2014  | Tsirkin |
| 2018/0365046 | A1* | 12/2018 | S S ........................ G06F 1/3203 |

FOREIGN PATENT DOCUMENTS

| EP | 3866003 A1 * | 8/2021 | ......... G06F 13/1668 |
| WO | 20170138967 A1 | 8/2017 | |

OTHER PUBLICATIONS

Extended European Search Report for European Patent Application No. 20212512.6, dated May 19, 2021, 7 pages.

(Continued)

*Primary Examiner* — Glenn A. Auve
(74) *Attorney, Agent, or Firm* — Jordan IP Law, LLC

(57) ABSTRACT

Systems, apparatuses and methods may provide for technology that stores first hardware related data to a basic input output system (BIOS) memory area and generates a mailbox data structure, wherein the mailbox data structure includes a first identifier-pointer pair associated with the first hardware related data. Additionally, the technology may generate an operating system (OS) interface table, wherein the OS interface table includes a pointer to the mailbox data structure. In one example, the technology also stores second hardware related data to the BIOS memory area at runtime and adds a second identifier-pointer pair to the mailbox data structure at runtime, wherein the second identifier-pointer pair is associated with the second hardware related data.

24 Claims, 5 Drawing Sheets

(56) References Cited

OTHER PUBLICATIONS

S. Jayakumar et al., "Open System Config Data: Firmware to Kernel," <docplayer.net/160262615-Open-system-config-data-firmware-to-kernel-sarathy-jayakumar-principal-engineer-intel-corp-natarajan-sivagar-software-engineer-google-inc.html>, Sep. 26, 2019, 22 pages.

uefi.org, "Advanced Configuration and Power Interface (ACPI) Specification," <uefi.org/sites/default/files/resources/ACPI_6_3_final_Jan30.pdf>, 1241 pages, version 6.3., retrieved Jan. 2019.

\* cited by examiner

US 11,809,878 B2

DEPLOYMENT OF BIOS TO OPERATING SYSTEM DATA EXCHANGE

TECHNICAL FIELD

Embodiments generally relate to operating system (OS) data exchanges. More particularly, embodiments relate to the deployment of basic input output system (BIOS) to OS data exchanges.

BACKGROUND

An OS running on a computing system may use standardized ACPI (Advanced Configuration and Power Interface, e.g., ACPI Specification, Ver. 6.3, January 2019) tables to obtain information about the underlying hardware of the system. In such a case, deploying new technologies to the system may involve modifying and publishing new ACPI tables to the industry ecosystem. Because the ACPI table publishing process typically calls for industry agreement, system upgrades may be relatively slow to take effect.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
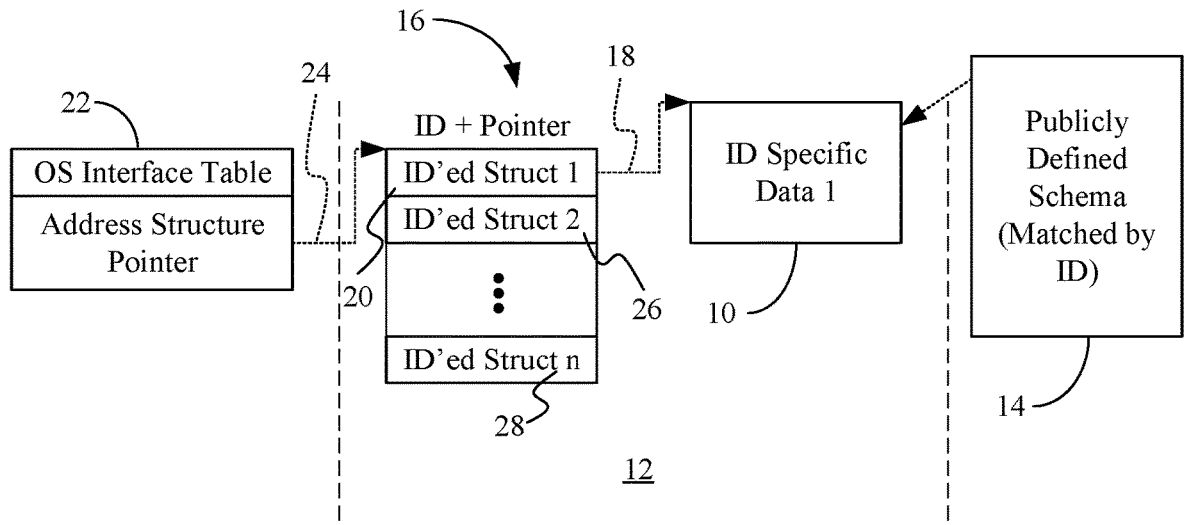
FIG. 1 is a block diagram of an example of a BIOS to OS data exchange according to an embodiment.

Turning now to FIG. 1, a BIOS (basic input output system) to OS (operating system) data exchange is shown in which hardware related data 10 (e.g., raw data) is stored to a BIOS memory area 12. In an embodiment, the BIOS memory area 12 is a region of memory such as, for example, ACPI (Advance Configuration and Power Interface) type 2 memory that is reserved for BIOS operations. The hardware related data 10 may include platform information such as, for example, memory margining information (e.g., DDR/ double data rate rank margining information), memory repair information (e.g., DDR post packaging repair information), memory topology information (e.g., memory map topology information), link margining information (e.g., PCIe/Peripheral Component Interconnect Express link/port and/or eMMC/Embedded Multimedia Card bus margining information), link topology information (e.g., PCIe link/port topology information), etc., or any combination thereof. The hardware related data 10 may also be associated with a publicly defined schema 14 that specifies/identifies how to interpret the hardware related data 10 (e.g., via JSON/JAVASCRIPT object notation, REDFISH, etc.). In an embodiment, the schema 14 is stored in a uniform resource locator (URL) and/or repository that is in the public domain.

In one example, a mailbox data structure 16 is automatically generated, wherein the mailbox data structure 16 includes a first identifier (ID)-pointer pair 20 (e.g., "ID'ed Struct 1") associated with the hardware related data 10. For example, the ID of the first ID-pointer pair 20 might be a globally unique ID (GUID) that is dedicated to the hardware related data 10 (e.g., rank margining information for a specific DDR module in the system) and a pointer 18 of the first ID-pointer pair 20 may specify the address of the hardware related data 10 in the BIOS memory area 12. In the illustrated example, the mailbox data structure 16 also includes a second ID-pointer pair 26 associated with second hardware related data (not shown). Thus, if the second hardware related data is post packaging repair information for the specific DDR module, the second ID-pointer pair 26 might include the GUID for the specific DDR module and the address of the post packaging repair information in the BIOS memory area 12. In an embodiment, the mailbox data structure 16 also includes an $n^{th}$ ID-pointer pair 28 that is associated with $n^{th}$ hardware related data (not shown). If, for example, the $n^{th}$ hardware related data is topology information or a specific PCIe link, then the $n^{th}$ ID-pointer pair may include the GUID of the specific PCIe link and the address of the topology information in the BIOS memory area 12.

Additionally, an OS interface table 22 may be automatically generated, wherein the OS interface table 22 includes a pointer 24 to the mailbox data structure 16. In an embodiment, the OS interface table 22 is a standardized ACPI table (e.g., Fixed ACPI Description Table/FADT). Of particular note is that the OS interface table 22 merely points to the mailbox data structure 16 and does not contain the hardware related data 10. Indeed, the publicly defined schema 14, which casts the hardware related data 10 in a consumable format, may be published independently from the OS interface table 22. Accordingly, the illustrated solution disconnects the OS interface table 22 (e.g., and the ACPI standard) from the hardware related data 10. Simply put, the illustrated solution provides for the exchange of data between the BIOS and the OS in a seamless, flexible and efficient manner.

Figure 2:
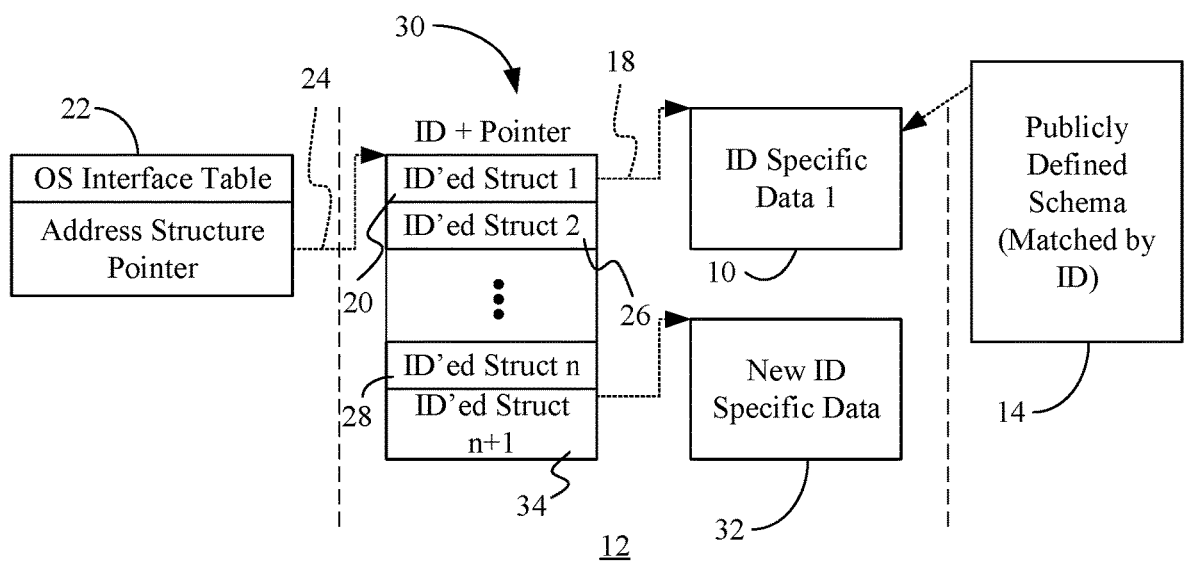
FIG. 2 is a block diagram of an example of a runtime update of a mailbox data structure according to an embodiment.

FIG. 2 shows a runtime scenario in which new hardware related data 32 is stored to the BIOS memory area 12 at runtime (e.g., without a conducting a warm system reset or OS kernel update). The new hardware related data 32 may include platform information such as, for example, memory margining information (e.g., DDR rank margining information), memory repair information (e.g., DDR post packaging repair information), memory topology information (e.g., memory map topology information), link margining information (e.g., PCIe link/port and/or eMMC bus margining information), link topology information (e.g., PCIe link/port topology information), etc., or any combination thereof. The new hardware related data 32 may also be associated with a new publicly defined schema (not shown) that specifies/ identifies how to interpret the new hardware related data 32 (e.g., via JSON, REDFISH, etc.).

In an embodiment, an $n+1^{th}$ ID-pointer pair 34 is automatically added to the mailbox data structure 30 at runtime, wherein the $n+1^{th}$ ID-pointer pair 34 is associated with the new hardware related data 32. Thus, if system data is being migrated from DDR4 SDRAM (Double Data Rate 4 Synchronous Dynamic Random-Access Memory) to DDR5 (Double Data Rate 5) SDRAM, the new hardware related data 32 might include memory topology information for the DDR5 memory. In the illustrated example, the OS interface table 22 remains fixed when the new hardware related data 32 is stored to the BIOS memory area 12 and the n+1$^{th}$ ID-pointer pair 34 is added to the mailbox data structure 30. Thus, new technologies may be deployed to the system without initiating a new ACPI table publishing process. Indeed, technology upgrades may be conducted even without a system reset (e.g., via a Platform Runtime Mechanism/ PRM that reduces non-monetizable downtimes). The illustrated solution therefore significantly enhances extensibility/ scalability, efficiency and/or performance.

Figure 3:
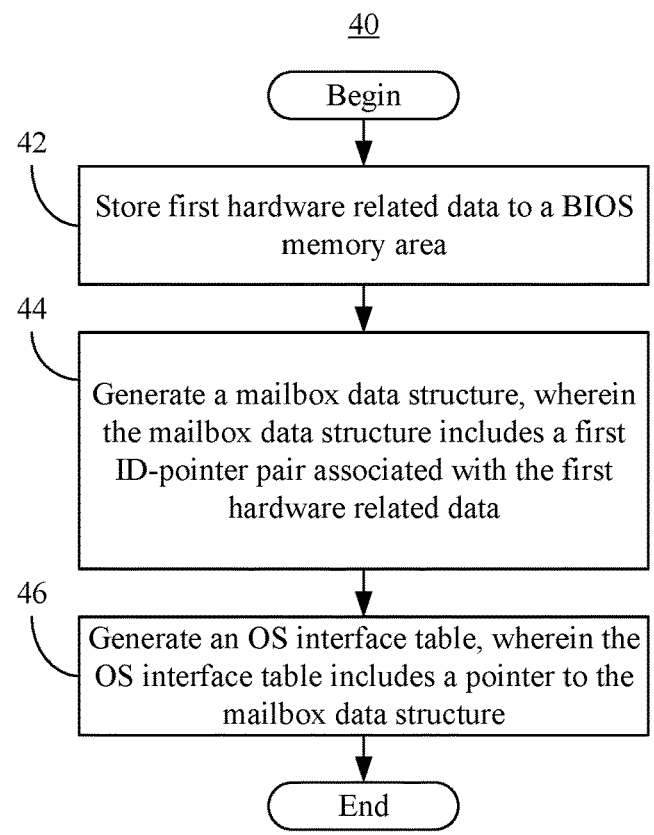
FIG. 3 is a flowchart of an example of a method of enabling a BIOS to OS data exchange according to an embodiment.

FIG. 3 shows a method 40 of enabling a BIOS to OS data exchange. The method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for storing first hardware related data (e.g., platform information such as memory margining information, memory repair information, memory topology information, link margining information, link topology information, etc., or any combination thereof) a BIOS memory area (e.g., ACPI Type 2 memory). In an embodiment, the first hardware related data is associated with a publicly defined schema. Block 44 generates a mailbox data structure (e.g., BIOS data ACPI table/BDAT), where the mailbox data structure includes a first ID-pointer pair associated with the first hardware related data. Additionally, an OS interface table (e.g., standardized ACPI table) may be generated at block 46. In the illustrated example, the OS interface table includes a pointer to the mailbox data structure.

Because the OS interface table merely points to the mailbox data structure and does not contain the first hardware related data, a number of advantages may be obtained. For example, the publicly defined schema, which may cast the first hardware related data in a consumable format, is published independently from the OS interface table and the OS interface table is disconnected from the first hardware related data. Thus, the illustrated method 40 provides for the exchange of data between the BIOS and the OS in a seamless, flexible and efficient manner.

Figure 4:
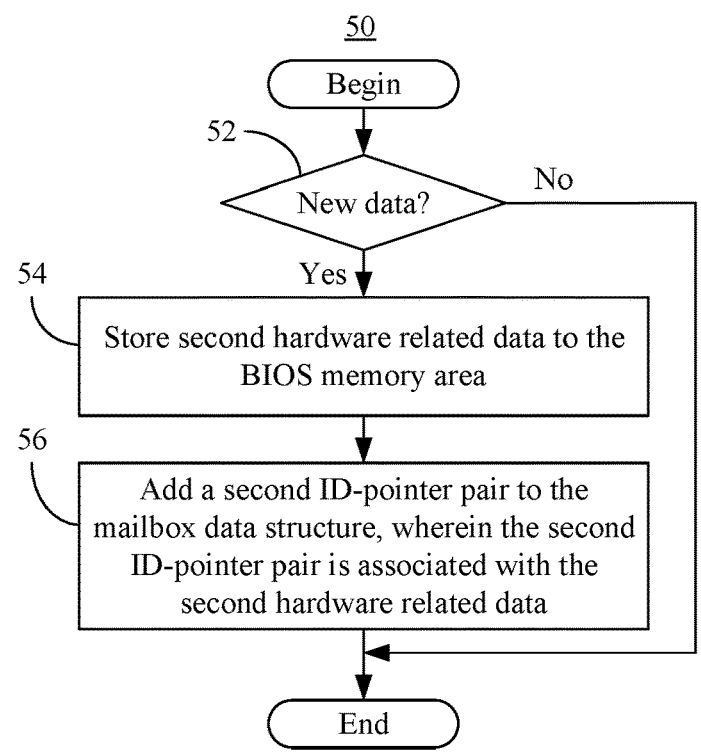
FIG. 4 is a flowchart of an example of a method of conducting a runtime update of a mailbox data structure according to an embodiment.

FIG. 4 shows a method 50 of conducting a runtime update of a mailbox data structure. The method 50 might be implemented and/or repeated subsequent to the method 40 (FIG. 3) in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 52 provides for determining whether new hardware related data is available at runtime. If so, block 54 stores second hardware related data to the BIOS memory area. Additionally, block 56 adds a second ID-pointer pair to the mailbox data structure, where the second ID-pointer pair is associated with the second hardware related data. In an embodiment, blocks 54 and 56 are conducted at runtime (e.g., without performing a system reset). Moreover, the OS interface table may remain fixed when blocks 54 and 56 are conducted. If it is determined at block 52 that there is no new hardware related data, the illustrated method 50 bypasses blocks 54 and 56, and terminates.

The illustrated method 50 therefore enables new technologies to be deployed to the system without initiating a new and time consuming ACPI table publishing process. Indeed, technology upgrades may be conducted even without a system reset (e.g., via a PRM that reduces non-monetizable downtimes). Accordingly, the method 50 significantly enhances extensibility/scalability, efficiency and/ or performance.

Figure 5:
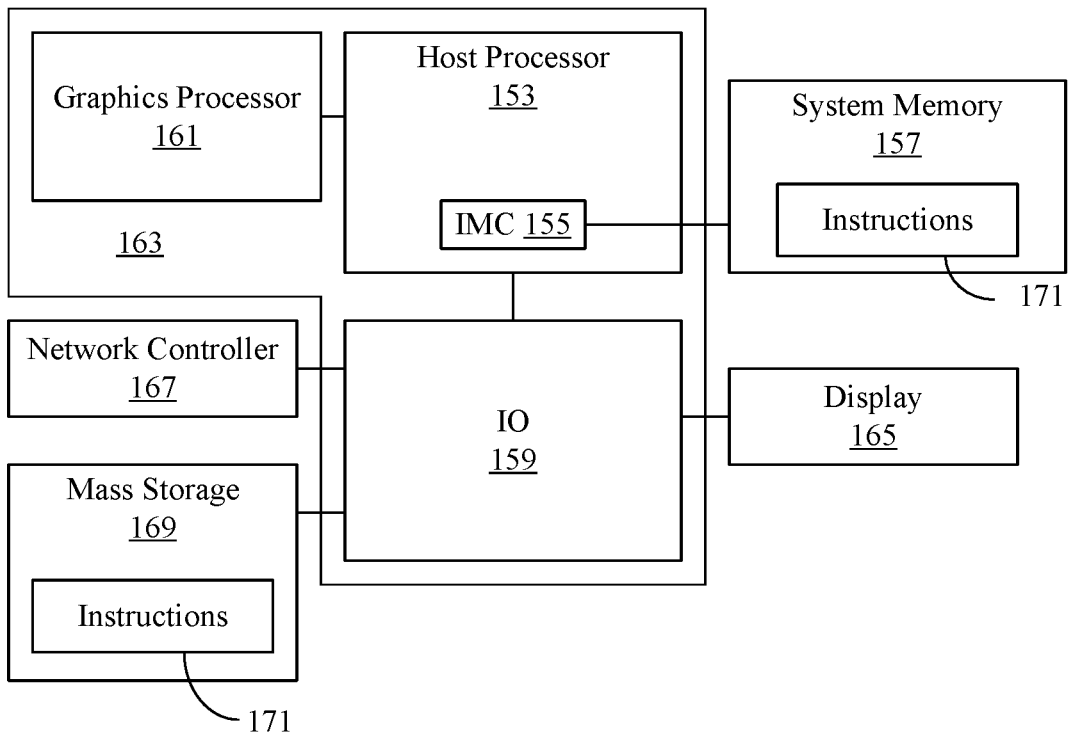
FIG. 5 is a block diagram of an example of a performance-enhanced computing system according to an embodiment.

Turning now to FIG. 5, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., central processing unit/CPU) having an integrated memory controller (IMC) 155 that is coupled to a system memory 157.

The illustrated system 151 also includes an input output (IO) module 159 implemented together with the host processor 153 and a graphics processor 161 on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory).

In an embodiment, the host processor 153, the graphics processor 161 and/or the IO module 159 execute program instructions 171 retrieved from the system memory 157 and/or the mass storage 169 to perform one or more aspects of the method 40 (FIG. 3) and/or the method 50 (FIG. 4), already discussed. Thus, execution of the illustrated instructions may cause the computing system 151 to store first hardware related data to a BIOS memory area and generate a mailbox data structure, wherein the mailbox data structure includes a first identifier-pointer pair associated with the first hardware related data. Additionally, execution of the instructions 171 may cause the system 151 to generate an OS interface table, wherein the OS interface table includes a pointer to the mailbox data structure. Execution of the instructions 171 may also cause the computing system 151 to add ID-pointer pairs to the mailbox data structure at runtime. The computing system 151 is therefore performance-enhanced at least to the extent that it disconnects the OS interface table from the first hardware related data. Indeed, the system 151 provides for the exchange of data between the BIOS and the OS in a seamless, flexible and efficient manner.

Figure 6:
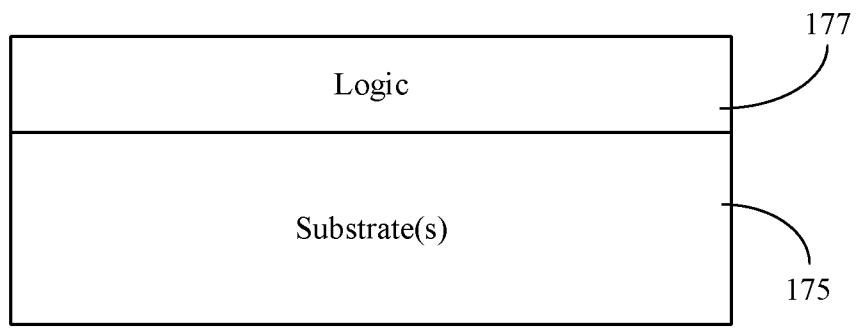
FIG. 6 is an illustration of an example of a semiconductor apparatus according to an embodiment.

FIG. 6 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 40 (FIG. 3) and/or the method 50 (FIG. 4), already discussed. Thus, the logic 177 may store first hardware related data to a BIOS memory area and generate a mailbox data structure, wherein the mailbox data structure includes a first identifier-pointer pair associated with the first hardware related data. Additionally, the logic 177 may generate an OS interface table, wherein the OS interface table includes a pointer to the mailbox data structure. The logic 177 may also add ID-pointer pairs to the mailbox data structure at runtime. The apparatus 173 is therefore performance-enhanced at least to the extent that it disconnects the OS interface table from the first hardware related data. Indeed, the apparatus 173 provides for the exchange of data between the BIOS and the OS in a seamless, flexible and efficient manner.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 7:
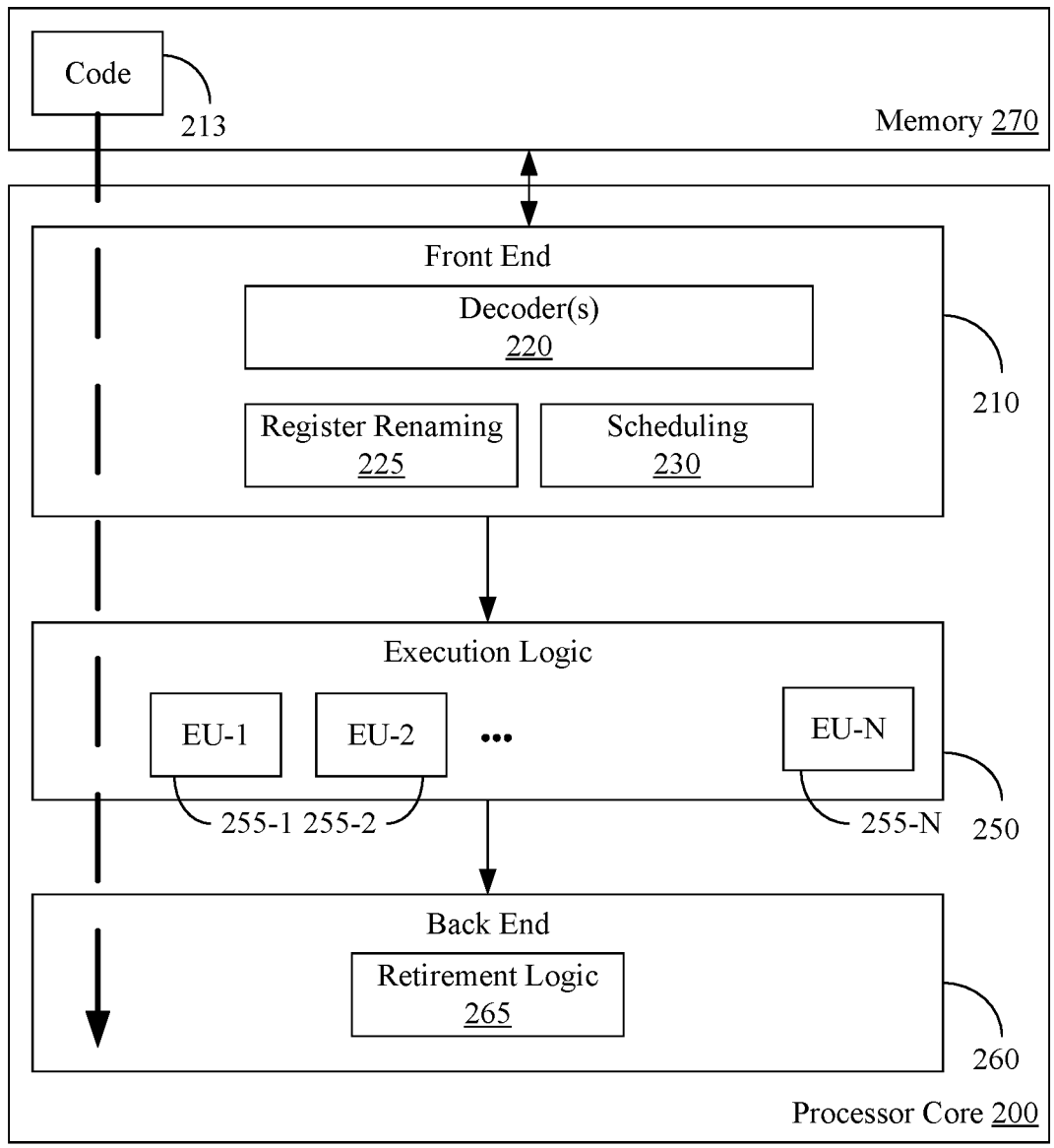
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 40 (FIG. 3) and/or the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
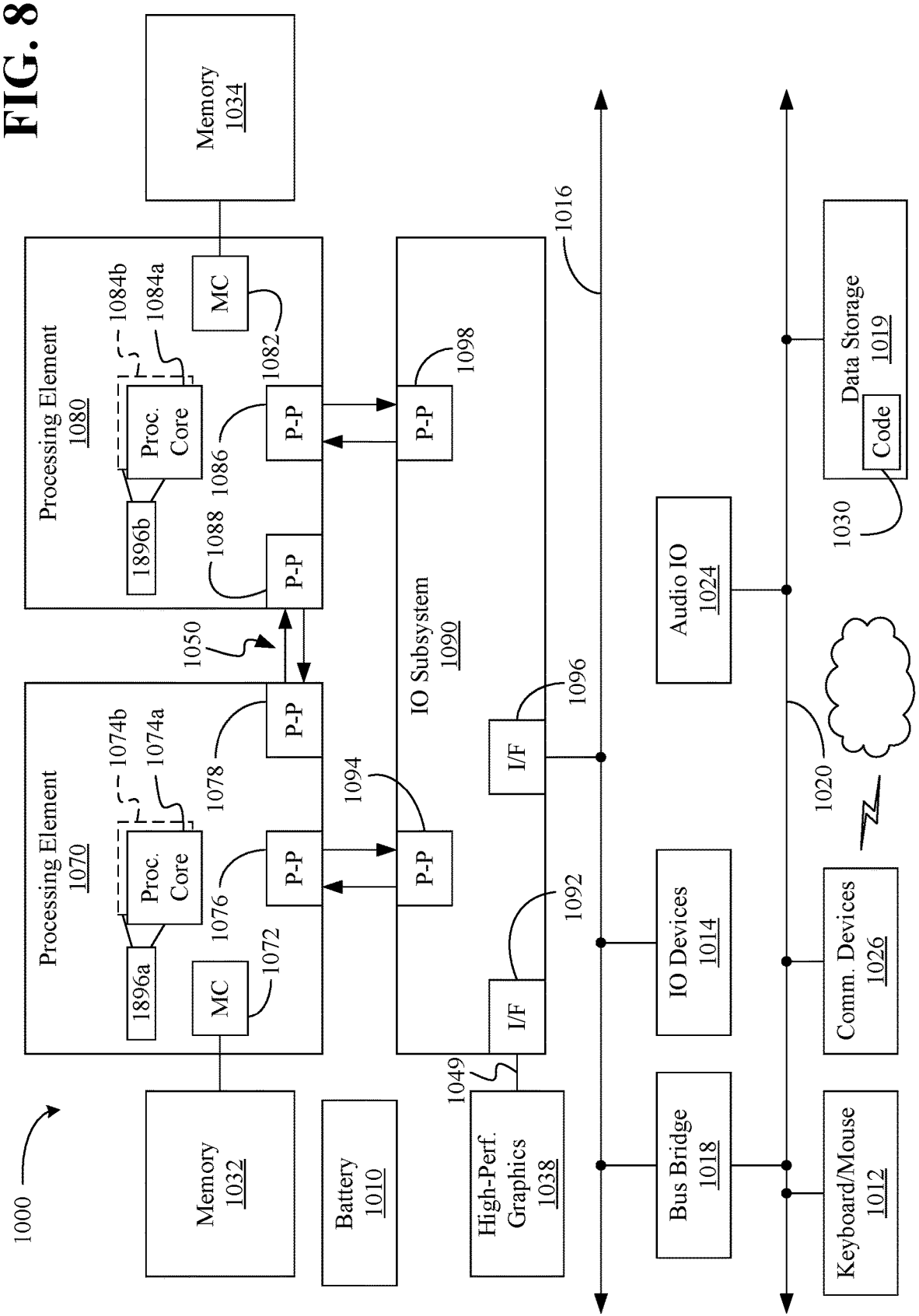
FIG. 8 is a block diagram of an example of a multi-processor based computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 40 (FIG. 3) and/or the method 50 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 includes a performance-enhanced computing system comprising a network controller, a processor coupled to the network controller, and a memory coupled to the processor, the memory including a set of executable program instructions, which when executed by the processor, cause the computing system to store first hardware related data to a basic input output system (BIOS) memory area, generate a mailbox data structure, wherein the mailbox data structure includes a first identifier-pointer pair associated with the first hardware related data, and generate an operating system (OS) interface table, wherein the OS interface table includes a pointer to the mailbox data structure.

Example 2 includes the computing system of Example 1, wherein the instructions, when executed, further cause the computing system to store second hardware related data to the BIOS memory area, and add a second identifier-pointer pair to the mailbox data structure, wherein the second identifier-pointer pair is associated with the second hardware related data.

Example 3 includes the computing system of Example 2, wherein the second hardware related data is to be stored to the BIOS memory area at runtime, and wherein the second identifier-pointer pair is to be added to the mailbox data structure at runtime.

Example 4 includes the computing system of Example 2, wherein the OS interface table is to remain fixed when the second hardware related data is stored to the BIOS memory area and the second identifier-pointer pair is added to the mailbox data structure.

Example 5 includes the computing system of Example 1, wherein the first hardware related data is to be associated with a publicly defined schema.

Example 6 includes the computing system of any one of Examples 1 to 5, wherein the OS interface table is to be a standardized advanced configuration and power interface (ACPI) table, and wherein the first hardware related data is to include platform information.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to store first hardware related data to a basic input output system (BIOS) memory area, generate a mailbox data structure, wherein the mailbox data structure includes a first identifier-pointer pair associated with the first hardware related data, and generate an operating system (OS) interface table, wherein the OS interface table includes a pointer to the mailbox data structure.

Example 8 includes the semiconductor apparatus of Example 7, wherein the logic coupled to the one or more substrates is to store second hardware related data to the BIOS memory area, and add a second identifier-pointer pair to the mailbox data structure, wherein the second identifier-pointer pair is associated with the second hardware related data.

Example 9 includes the semiconductor apparatus of Example 8, wherein the second hardware related data is to be stored to the BIOS memory area at runtime, and wherein the second identifier-pointer pair is to be added to the mailbox data structure at runtime.

Example 10 includes the semiconductor apparatus of Example 8, wherein the OS interface table is to remain fixed when the second hardware related data is stored to the BIOS memory area and the second identifier-pointer pair is added to the mailbox data structure.

Example 11 includes the semiconductor apparatus of any one of Examples 7 to 10, wherein the first hardware related data is to be associated with a publicly defined schema, the OS interface table is to be a standardized advanced configuration and power interface (ACPI) table, and the first hardware related data is to include platform information.

Example 12 includes the semiconductor apparatus of any one of Examples 7 to 11, wherein the logic coupled to the one or more substrates includes transistor channel regions that are positioned within the one or more substrates.

Example 13 includes at least one computer readable storage medium comprising a set of executable program instructions, which when executed by a computing system, cause the computing system to store first hardware related data to a basic input output system (BIOS) memory area, generate a mailbox data structure, wherein the mailbox data structure includes a first identifier-pointer pair associated with the first hardware related data, and generate an operating system (OS) interface table, wherein the OS interface table includes a pointer to the mailbox data structure.

Example 14 includes the computer readable storage medium of Example 13, wherein the instructions, when executed, further cause the computing system to store second hardware related data to the BIOS memory area, and add a second identifier-pointer pair to the mailbox data structure, wherein the second identifier-pointer pair is associated with the second hardware related data.

Example 15 includes the computer readable storage medium of Example 14, wherein the second hardware related data is to be stored to the BIOS memory area at runtime, and wherein the second identifier-pointer pair is to be added to the mailbox data structure at runtime.

Example 16 includes the computer readable storage medium of Example 14, wherein the OS interface table is to remain fixed when the second hardware related data is stored to the BIOS memory area and the second identifier-pointer pair is added to the mailbox data structure.

Example 17 includes the computer readable storage medium of Example 13, wherein the first hardware related data is to be associated with a publicly defined schema.

Example 18 includes the computer readable storage medium of any one of Examples 13 to 17, wherein the OS interface table is to be a standardized advanced configuration and power interface (ACPI) table, and wherein the first hardware related data is to include platform information.

Example 19 includes a method of operating a performance-enhanced computing system, the method comprising storing first hardware related data to a basic input output system (BIOS) memory area, generating a mailbox data structure, wherein the mailbox data structure includes a first identifier-pointer pair associated with the first hardware related data, and generating an operating system (OS) interface table, wherein the OS interface table includes a pointer to the mailbox data structure.

Example 20 includes the method of Example 19, further including storing second hardware related data to the BIOS memory area and adding a second identifier-pointer pair to the mailbox data structure, wherein the second identifier-pointer pair is associated with the second hardware related data.

Example 21 includes the method of Example 20, wherein the second hardware related data is stored to the BIOS memory area at runtime, and wherein the second identifier-pointer pair is added to the mailbox data structure at runtime.

Example 22 includes the method of Example 20, wherein the OS interface table remains fixed when the second hardware related data is stored to the BIOS memory area and the second identifier-pointer pair is added to the mailbox data structure.

Example 23 includes the method of Example 19, wherein the first hardware related data is associated with a publicly defined schema.

Example 24 includes the method of any one of Examples 19 to 23, wherein the OS interface table is a standardized advanced configuration and power interface (ACPI) table, and wherein the first hardware related data includes platform information.

Example 25 includes means for performing the method of any one of Examples 19 to 24.

Thus, technology described herein may use richer REDFISH/JSON based schemas to describe data that is published for interpretation. The schemas may also be more flexible by providing vendor specific data in an industry standard format. Technology described herein may also disconnect vendor specific data from ACPI specification revisions. As a result, greater extensibility may be achieved, new schemas may be added without specification updates, and a richer alternative to the ACPI name space may result. For example, system hierarchies may be described in an efficient and scalable manner.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, the memory including a set of executable program instructions, which when executed by the processor, cause the computing system to:
store first hardware related data to a basic input output system (BIOS) memory area, wherein the BIOS memory area is a memory region reserved for BIOS operations,
generate a mailbox data structure, wherein the mailbox data structure includes a first identifier-pointer pair associated with the first hardware related data, and
generate an operating system (OS) interface table outside the BIOS memory area, wherein the OS interface table includes a pointer to the mailbox data structure, and wherein the OS interface table is a standardized advanced configuration and power interface table that is accessible by an operating system.

2. The computing system of claim 1, wherein the instructions, when executed, further cause the computing system to:
store second hardware related data to the BIOS memory area, and
add a second identifier-pointer pair to the mailbox data structure, wherein the second identifier-pointer pair is associated with the second hardware related data.

3. The computing system of claim 2, wherein the second hardware related data is to be stored to the BIOS memory area at runtime, and wherein the second identifier-pointer pair is to be added to the mailbox data structure at runtime.

4. The computing system of claim 2, wherein the OS interface table is to remain fixed when the second hardware related data is stored to the BIOS memory area and the second identifier-pointer pair is added to the mailbox data structure.

5. The computing system of claim 1, wherein the first hardware related data is to be associated with a publicly defined schema.

6. The computing system of claim 1, wherein the first hardware related data is to include platform information.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
store first hardware related data to a basic input output system (BIOS) memory area, wherein the BIOS memory area is a memory region reserved for BIOS operations;
generate a mailbox data structure, wherein the mailbox data structure includes a first identifier-pointer pair associated with the first hardware related data; and
generate an operating system (OS) interface table outside the BIOS memory area, wherein the OS interface table includes a pointer to the mailbox data structure, and wherein the OS interface table is a standardized advanced configuration and power interface table that is accessible by an operating system.

8. The semiconductor apparatus of claim 7, wherein the logic coupled to the one or more substrates is to:
store second hardware related data to the BIOS memory area; and
add a second identifier-pointer pair to the mailbox data structure, wherein the second identifier-pointer pair is associated with the second hardware related data.

9. The semiconductor apparatus of claim 8, wherein the second hardware related data is to be stored to the BIOS memory area at runtime, and wherein the second identifier-pointer pair is to be added to the mailbox data structure at runtime.

10. The semiconductor apparatus of claim 8, wherein the OS interface table is to remain fixed when the second hardware related data is stored to the BIOS memory area and the second identifier-pointer pair is added to the mailbox data structure.

11. The semiconductor apparatus of claim 7, wherein the first hardware related data is to be associated with a publicly defined schema, and the first hardware related data is to include platform information.

12. The semiconductor apparatus of claim 7, wherein the logic coupled to the one or more substrates includes transistor channel regions that are positioned within the one or more substrates.

13. At least one non-transitory computer readable storage medium comprising a set of executable program instructions, which when executed by a computing system, cause the computing system to:
store first hardware related data to a basic input output system (BIOS) memory area, wherein the BIOS memory area is a memory region reserved for BIOS operations;
generate a mailbox data structure, wherein the mailbox data structure includes a first identifier-pointer pair associated with the first hardware related data; and
generate an operating system (OS) interface table outside the BIOS memory area, wherein the OS interface table includes a pointer to the mailbox data structure, and wherein the OS interface table is a standardized advanced configuration and power interface table that is accessible by an operating system.

14. The non-transitory computer readable storage medium of claim 13, wherein the instructions, when executed, further cause the computing system to:
store second hardware related data to the BIOS memory area; and
add a second identifier-pointer pair to the mailbox data structure, wherein the second identifier-pointer pair is associated with the second hardware related data.

15. The non-transitory computer readable storage medium of claim 14, wherein the second hardware related data is to be stored to the BIOS memory area at runtime, and wherein the second identifier-pointer pair is to be added to the mailbox data structure at runtime.

16. The non-transitory computer readable storage medium of claim 14, wherein the OS interface table is to remain fixed when the second hardware related data is stored to the BIOS memory area and the second identifier-pointer pair is added to the mailbox data structure.

17. The non-transitory computer readable storage medium of claim 13, wherein the first hardware related data is to be associated with a publicly defined schema.

18. The non-transitory computer readable storage medium of claim 13, wherein the first hardware related data is to include platform information.

19. A method comprising:
storing first hardware related data to a basic input output system (BIOS) memory area, wherein the BIOS memory area is a memory region reserved for BIOS operations;
generating a mailbox data structure, wherein the mailbox data structure includes a first identifier-pointer pair associated with the first hardware related data; and
generating an operating system (OS) interface table outside the BIOS memory area, wherein the OS interface table includes a pointer to the mailbox data structure, and wherein the OS interface table is a standardized advanced configuration and power interface table that is accessible by an operating system.

20. The method of claim 19, further including:
storing second hardware related data to the BIOS memory area; and
adding a second identifier-pointer pair to the mailbox data structure, wherein the second identifier-pointer pair is associated with the second hardware related data.

21. The method of claim 20, wherein the second hardware related data is stored to the BIOS memory area at runtime, and wherein the second identifier-pointer pair is added to the mailbox data structure at runtime.

22. The method of claim 20, wherein the OS interface table remains fixed when the second hardware related data is stored to the BIOS memory area and the second identifier-pointer pair is added to the mailbox data structure.

23. The method of claim 19, wherein the first hardware related data is associated with a publicly defined schema.

24. The method of claim 19, wherein the first hardware related data includes platform information.

\* \* \* \* \*